(12) United States Patent
Weindorf et al.

(10) Patent No.: US 12,097,452 B2
(45) Date of Patent: *Sep. 24, 2024

(54) WATER DRAINAGE DEVICE, FILTER MODULE, AND METHOD

(71) Applicant: MANN+HUMMEL GmbH, Ludwigsburg (DE)

(72) Inventors: Martin Weindorf, Kornwestheim (DE); Rafael Salom, Remseck (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,401

(22) Filed: Oct. 24, 2023

(65) Prior Publication Data

US 2024/0050877 A1    Feb. 15, 2024

Related U.S. Application Data

(63) Continuation of application No. 17/685,134, filed on Mar. 2, 2022, now Pat. No. 11,794,137.

(30) Foreign Application Priority Data

Mar. 9, 2021   (DE) .................... 102021105692.6

(51) Int. Cl.
*B01D 36/00* (2006.01)
*B01D 35/157* (2006.01)
(Continued)

(52) U.S. Cl.
CPC ......... *B01D 36/003* (2013.01); *B01D 35/157* (2013.01); *B01D 35/1573* (2013.01);
(Continued)

(58) Field of Classification Search
CPC ................ B01D 36/003; B01D 35/157; B01D 35/1573; B01D 35/005; B01D 2201/16;
(Continued)

(56) References Cited

U.S. PATENT DOCUMENTS 2,057,932 A    10/1936   Bolser
4,855,041 A  *  8/1989   Church ................ B01D 36/001
                                                           137/203
2002/0050469 A1  5/2002   Jokschas

FOREIGN PATENT DOCUMENTS

DE          102010046528 A1    3/2012

OTHER PUBLICATIONS

Office Action in corresponding German Appln. No. 102021105692.6, May 14, 2024, 8 pages, Germany.

* cited by examiner

*Primary Examiner* — Waqaas Ali

(57) ABSTRACT

A water drainage device for a filter module is provided with a valve housing that has a valve bore and a valve body received at least in sections thereof in the valve bore. The water drainage device can be transferred from a closed state, in which the valve body seals in relation to a valve seat of the valve bore, into an open state, in which the valve body is lifted off the valve seat, and transferred from the open state into the closed state. The valve body, upon transfer of the water drainage device from the closed state into the open state, moves linearly along the longitudinal axis of the valve bore and away from the valve seat along or at a slant to a direction of gravity in downward direction.

10 Claims, 5 Drawing Sheets

(51) Int. Cl.
*F16K 24/04* (2006.01)
*F16K 31/50* (2006.01)
*B01D 35/00* (2006.01)

(52) U.S. Cl.
CPC ............ *F16K 24/04* (2013.01); *F16K 31/502* (2013.01); *B01D 35/005* (2013.01); *B01D 2201/16* (2013.01); *B01D 2201/304* (2013.01); *B01D 2201/342* (2013.01)

(58) Field of Classification Search
CPC ........ B01D 2201/304; B01D 2201/342; B01D 29/15; B01D 35/153; B01D 35/16; B01D 36/006; F16K 24/04; F16K 31/502; F02M 37/28
See application file for complete search history.

WATER DRAINAGE DEVICE, FILTER MODULE, AND METHOD

BACKGROUND OF THE INVENTION

The present invention concerns a water drainage device for a filter module, in particular for a fuel filter module, a filter module, in particular a fuel filter module, with such a water drainage device, and a method for actuating a water drainage device of a filter module, in particular of a fuel filter module.

Fuel of internal combustion engines usually comprises a water proportion that is harmful for modern injection systems and therefore must be separated by suitable filter elements. Due to its higher specific weight in comparison to the specific weight of fuel, this water proportion collects usually at the lowest point of a filter housing of a fuel filter. In order to prevent that this separated water proportion surpasses a maximum level and is conveyed farther in the fuel system, it must be possible to drain this water proportion after sensing by a water sensor or at the latest in intervals during servicing.

EP 1 544 453 A2 discloses a valve arrangement for draining water from the housing of a fuel filter, comprised of a housing, at which at a lateral low point a drainage opening is arranged, wherein into the drainage opening at the same time a cylindrical bore opens which is arranged in the housing wall and creates a connection to the environment side, wherein in the cylindrical bore, at a point which is geodetically positioned above the drainage opening, a connection hole to the housing interior is arranged, wherein in the bore an axially movable cylinder pin is arranged in such a way that the cylinder pin closes the drainage opening by an axial pressure with a seal element, arranged at the end face, and closes off the bore in the region above the connection hole at the same time by a seal arranged at the cylinder pin.

SUMMARY OF THE INVENTION

In view of this background, the present invention has the object to provide an improved water drainage device for a filter module.

Accordingly, a water drainage device for a filter module, in particular for a fuel filter module, is proposed. The water drainage device comprises a valve housing that comprises a valve bore and a valve body that, at least in sections thereof, is received in the valve bore, wherein the water drainage device can be transferred from a closed state, in which the valve body seals in relation to a valve seat of the valve bore, into an open state, in which the valve body is lifted off the valve seat, and in reverse, and wherein the valve body, upon transfer of the water drainage device from the closed state into the open state, moves linearly along a longitudinal axis of the valve bore and away from the valve seat along or at a slant to a direction of gravity in downward direction.

Since the valve body moves in downward direction, it is possible to machine the valve bore from below by cutting. This simplifies the manufacture of the water drainage device or of the filter module.

The filter module can also be referred to as filter system. The filter module is suitable for filtering fuel, for example, diesel, gasoline, or kerosene. The filter module however can also be suitable for filtering any type of fluid. The valve housing is preferably tubular and substantially configured with rotational symmetry to the longitudinal axis of the valve bore. The valve bore is a stepped bore or bore with steps. That the valve body is "at least in sections thereof" received in the valve bore means presently that the valve body at least partially can also be arranged outside of the valve bore. This means in particular that the valve housing accommodates in it the valve body at least in sections thereof.

The valve body is preferably of rotational symmetry in relation to the longitudinal axis of the valve bore. Like the valve bore, the valve body comprises preferably a stepped geometry. The valve body at least in sections thereof can be of a hollow shape. In the closed state, the valve body seals relative to the valve seat of the valve bore such that no water can flow through the water drainage device or through the valve bore. In the open state, on the other hand, in which the valve body is lifted off the valve seat, the water can flow through the water drainage device and in particular the valve bore.

That the valve body, upon transfer of the water drainage device from the closed state into the open state, moves "linearly" along the longitudinal axis of the valve bore means presently in particular that the valve body carries out a translatory movement, respectively, a movement along a straight line, namely along the longitudinal axis. This can be realized, for example, in that the valve body is linearly displaced in the valve bore. That the valve body moves "in downward direction" means presently that, for an intended mounting or for an intended installation of the water drainage device, the latter is arranged in such a way that the valve body, upon transfer of the water drainage device from the closed state into the open state, moves along or at a slant to the direction of gravity.

In embodiments, the valve bore comprises a thread section and the valve body comprises a counter thread section corresponding to the thread section, wherein the thread section and the counter thread section are interacting in such a way that they convert a rotational movement of the valve body in relation to the valve housing into a linear movement of the valve body along the longitudinal axis. The thread section is preferably an inner thread. The counter thread section is accordingly an outer thread provided on the valve body. The thread section and the counter thread section interact in such a way with each other that, upon rotational movement of the valve body in relation to the valve housing, the valve body moves linearly along the longitudinal axis. Depending on the rotational direction, the valve body can be moved either into the valve housing in order to transfer the water drainage device into the closed state or the valve body can be moved out of the valve housing in order to transfer the water drainage device from the closed state into the open state.

In a particularly preferred embodiment, the thread section of the valve bore is arranged in an end region of the valve bore that is located at the bottom in relation to the direction of gravity and, in particular, the counter thread section of the valve body is arranged in an end region of the valve body that is located at the bottom in the direction of gravity. In this way, a manufacture, in particular by mechanical machining, of the thread section of the valve bore from a bottom side is enabled which has advantages in the manufacturing process.

In embodiments, the thread section and the counter thread section are left-handed. Alternatively, the thread section and the counter thread section can also be right-handed. Instead of the thread section and the counter thread section, for example, also a bayonet closure can be provided which also makes it possible to convert a rotational movement of the valve body in relation to the valve housing into a linear movement.

In embodiments, the valve bore widens viewed along the direction of gravity. This means in particular that a diameter of the valve bore becomes larger along the longitudinal axis thereof, respectively, along the direction of gravity. For this purpose, the valve bore is preferably embodied as a stepped bore or a bore with steps.

The water drainage device comprises moreover an actuation rod that is connected force-transmittingly to the valve body. Force transmission means in particular torque transmission. By means of the actuation rod, a rotational movement of the handwheel can be transmitted onto the valve body. For example, the actuation rod is connected with form fit to the valve body. A form-fit connection is produced by mutual engagement or engagement from behind of two connection partners. For example, the actuation rod comprises a hexagonal outer geometry, wherein the valve body in this case comprises a corresponding hexagon-shaped inner geometry. For example, the actuation rod is locked or clipped into the valve body.

In embodiments, the actuation rod can comprise a handwheel that preferably is provided at an end of the actuation rod which is remote from the valve body.

In embodiments, the valve body comprises a first seal element that seals the valve body radially in relation to the valve bore. The first seal element can be an O-ring. At the valve body, a circumferential annular groove in which this first seal element is received can be provided for the first seal element. "Radial" presently means oriented in a direction perpendicularly away from the longitudinal axis of the valve bore.

In embodiments, the valve body comprises a second seal element that axially seals in relation to the valve seat in the closed state and that is lifted off the valve seat in the open state. The second seal element can also be an O-ring. The second seal element can however also comprise a rectangular cross section geometry. "Axial" presently means along the longitudinal axis. In the closed state, the second seal element is pressed axially against the disk-shaped valve seat in order to seal the valve body in relation to the valve seat. The valve body can comprise an annular groove in which the second seal element is received.

In embodiments, the valve body comprises a third seal element that seals the valve body radially in relation to the valve bore, wherein the second seal element, viewed along the longitudinal axis, is arranged between the first seal element and the third seal element. The third seal element can also be an O-ring. At the valve body, a circumferential annular groove in which the third seal element is received can be provided for the third seal element.

The valve bore completely passes through the valve housing so that the valve housing is open at both end faces. This means in particular that, depending on the position of the valve body in the valve bore, the valve body can project from the valve housing at an end face.

In embodiments, the water drainage device comprises moreover a water drainage channel that opens into the valve bore and a water drainage socket that leads out of the valve bore, wherein the valve body interrupts a fluid connection between the water drainage channel and the water drainage socket in the closed state and wherein the valve body releases the fluid connection between the water drainage channel and the water drainage socket in the open state. The water drainage channel is preferably connected to a lowest point of a water collection chamber of a filter housing of the filter module. Preferably, the water collection chamber has a bottom which is slanted in the direction toward the water drainage channel.

In a particularly preferred embodiment, the first seal element and the second seal element, viewed in the direction of gravity, are positioned below the opening of the water drainage channel in the valve bore and the third seal element, viewed in the direction of gravity, above the opening of the water drainage channel in the valve bore. According to this embodiment, the valve body is permanently sealed outwardly in relation to the valve bore by the third seal element so that no leakages occur through the open end of the valve housing positioned at the top, viewed in the direction of gravity.

Moreover, a filter module, in particular a fuel filter module, with such a water drainage device is proposed, wherein the valve body, when transferring the water drainage device from the closed state into the open state, is moved from a housing top part of a filter housing of the filter module in the direction of gravity in downward direction.

The filter module is used preferably in vehicles, in particular in land craft. For example, the filter module can be used in utility vehicles, such as, for example, trucks, construction machines or harvesting machines. In particular, the filter module is suitable for so-called "heavy-duty" applications. The filter module however can also be used in immobile applications, for example, in the building technology. In addition to the housing top part, the filter housing comprises a housing bottom part at which the housing top part is mounted so as to be removable. The housing bottom part can comprise a filter element receiving region for receiving a filter element. The filter element is suitable for filtering out particles or suspended substances from a fluid to be filtered, for example, fuel. The filter element can be a fuel filter element. Moreover, the filter element is also suitable to separate water from the fluid to be filtered. In addition to the filter element receiving region, the housing bottom part, viewed along the direction of gravity, comprises, arranged below the filter element receiving region, the water collection chamber that is configured to collect the water that has been separated by means of the filter element. The water drainage device can be provided at the water collection chamber.

The water collection chamber is connected in fluid communication by a water drainage channel of the water drainage device to the valve bore of the water drainage device. The water drainage channel extends with a radial component in relation to a longitudinal axis of the filter module.

In embodiments, a longitudinal axis of the filter module and the longitudinal axis of the valve bore are positioned at a slant to each other at a slant angle, wherein the slant angle is an acute angle. "Acute angle" is to be understood presently as an angle of less than 90°. For example, the slant angle amounts to 5° to 20°.

In embodiments, the valve housing is configured as one piece, in particular monolithic, together with a housing of the filter housing, in particular a housing bottom part of the filter housing. "One piece" or "one part" means presently that the valve housing and the housing bottom part are not assembled of different components but form a common component. "Monolithic" means presently that the valve housing and the housing bottom part are manufactured throughout of the same material. For example, the housing bottom part is a plastic component, in particular an injection-molded plastic component. The housing bottom part can however also be a metal component, for example, a diecast aluminum component.

In embodiments, at the housing, in particular at the housing bottom part, an eye can be formed integrally through which an actuation rod, in particular with a handwheel, is passed for actuation of the valve body. The eye is preferably arranged at an upper rim of the housing bottom part. In the eye, an elastically deformable sleeve, in particular a rubber sleeve, can be received through which the actuation rod is passed. Since the eye is attached to the upper rim of the housing bottom part, the handwheel can be actuated comfortably.

Moreover, a method for actuation of a water drainage device of a filter module, in particular a fuel filter module, is proposed. In this context, the water drainage device comprises a valve housing that comprises a valve bore and a valve body that, at least in sections thereof, is received in the valve bore, wherein the water drainage device is transferred from a closed state, in which the valve body seals in relation to a valve seat of the valve bore, into an open state, in which the valve body is lifted off the valve seat, and in reverse, and wherein the valve body, upon transfer of the water drainage device from the closed state into the open state, is moved linearly along a longitudinal axis of the valve bore and away from the valve seat along or at a slant to a direction of gravity in downward direction. The valve bore completely passes through the valve housing so that the valve housing is open at both end faces. The water drainage device comprises moreover an actuation rod that is coupled force-transmittingly to the valve body at an end of the valve body that is at the top viewed in the direction of gravity, wherein the actuation rod is actuated for transferring the water drainage device from the closed state into the open state.

Transferring the water drainage device from the closed state into the open state and in reverse is achieved in particular by a rotational movement of the valve body in relation to the valve housing, as explained supra. This rotational movement is converted by the thread section and the counter thread section corresponding thereto into the linear movement along the longitudinal axis of the valve bore. In doing so, the valve body then moves away from the valve seat and along or at a slant to the direction of gravity in downward direction. This requires an intended or proper mounting of the water drainage device. The water drainage device is in particular mounted in such a way that the aforementioned water drainage channel, viewed in relation to the direction of gravity, is arranged above the valve seat. When the valve body is lifted off the valve seat, the water to be drained flows from the water collection chamber of the housing bottom part through the water drainage channel, the valve bore, and the water drainage socket into an environment of the water drainage device.

BRIEF DESCRIPTION OF THE DRAWINGS

In the Figures, same or functionally the same elements, inasmuch as nothing different is indicated, are provided with the same reference characters.

DESCRIPTION OF PREFERRED EMBODIMENTS

Figure 1:
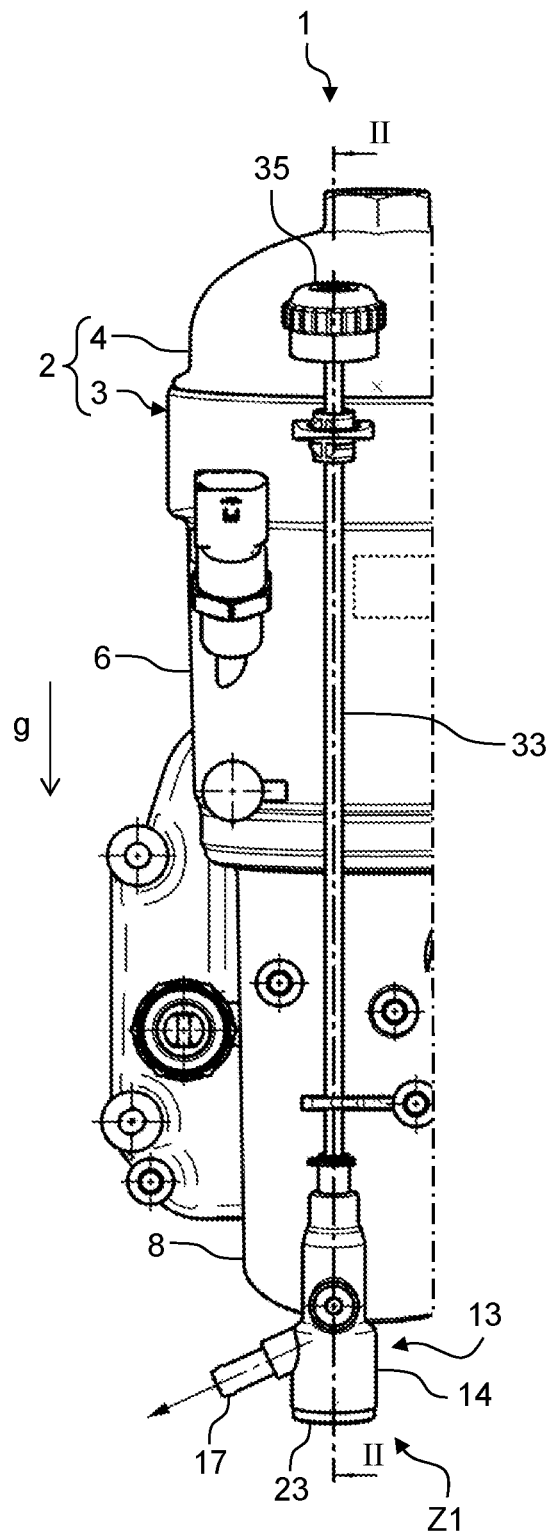
FIG. 1 shows a schematic partial view of an embodiment of a filter module.
Figure 2:
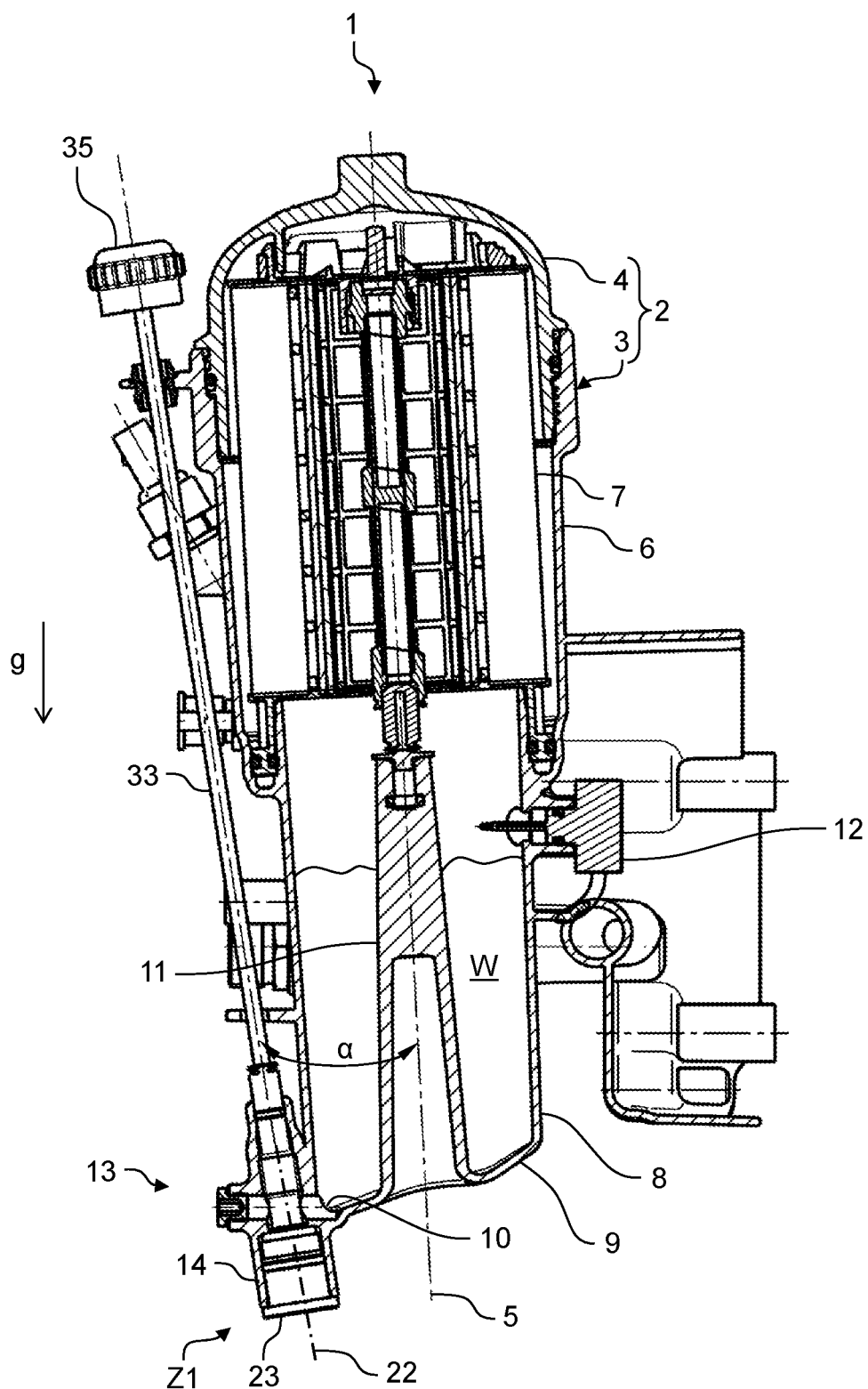
FIG. 2 shows a schematic section view of the filter module according to the section line II-II of FIG. 1.
Figure 3:
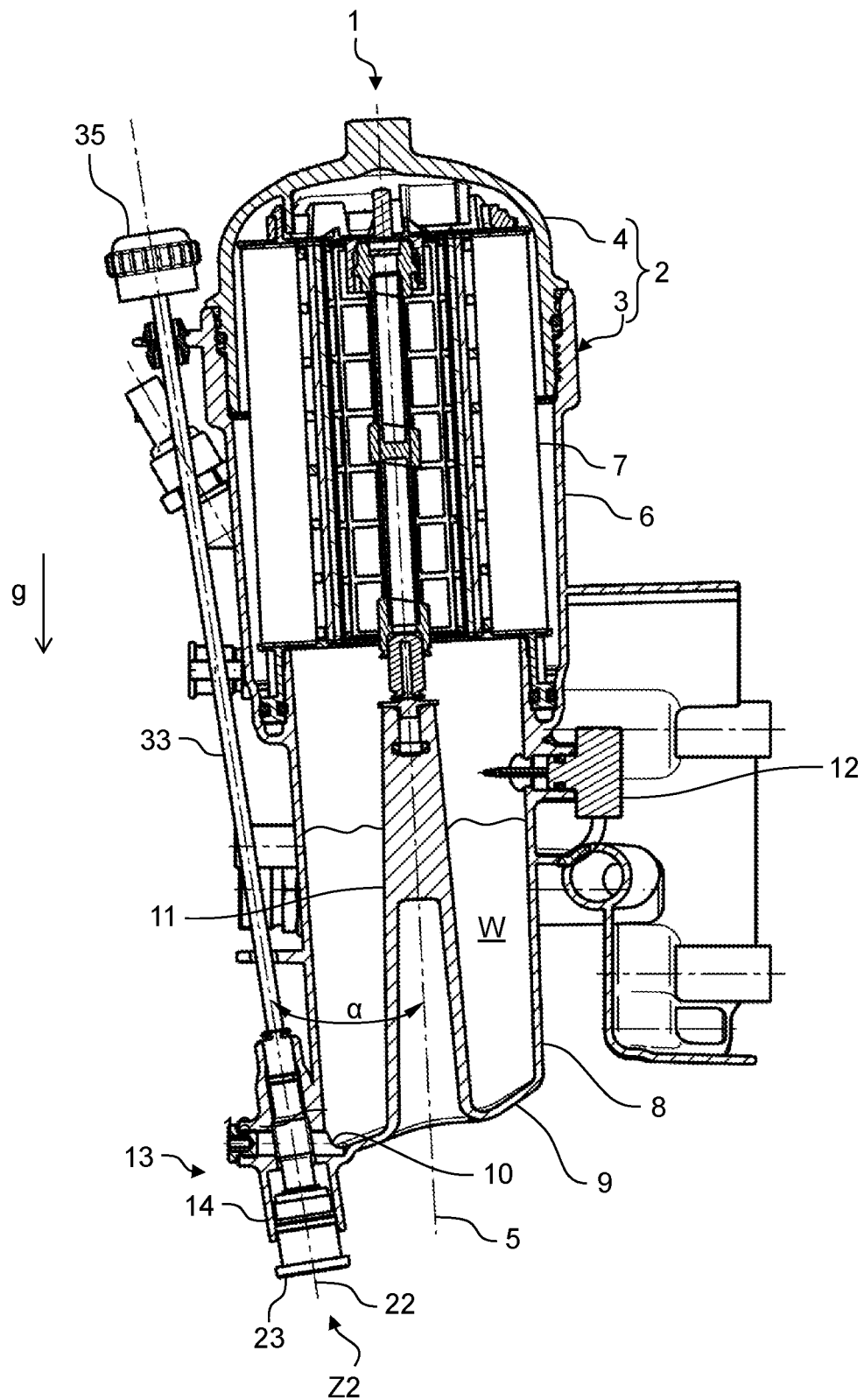
FIG. 3 shows a further schematic section view of the filter module according to the section line II-II of FIG. 1.
Figure 4:
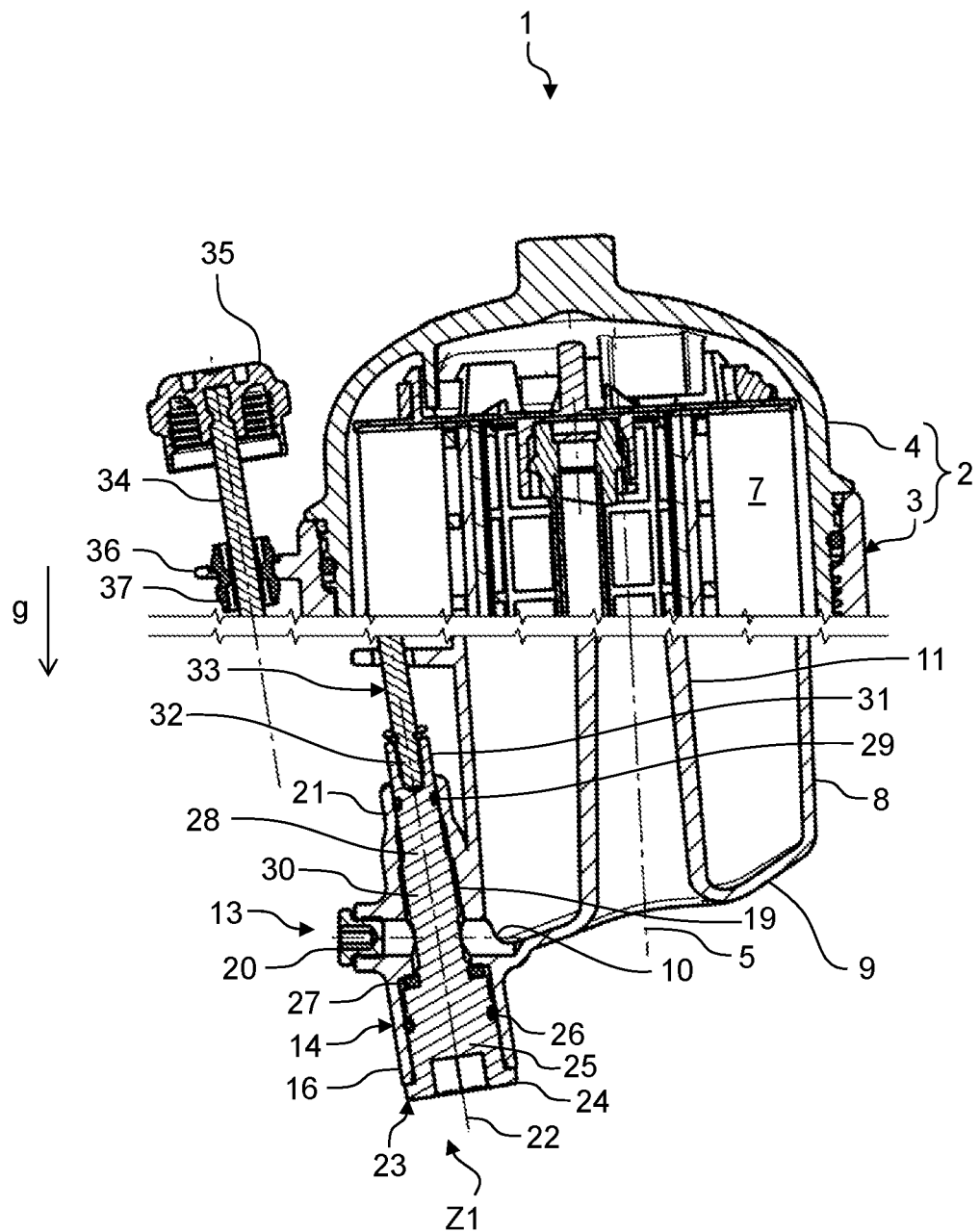
FIG. 4 shows a schematic partial section view of the filter module according to the section line II-II of FIG. 1.
Figure 5:
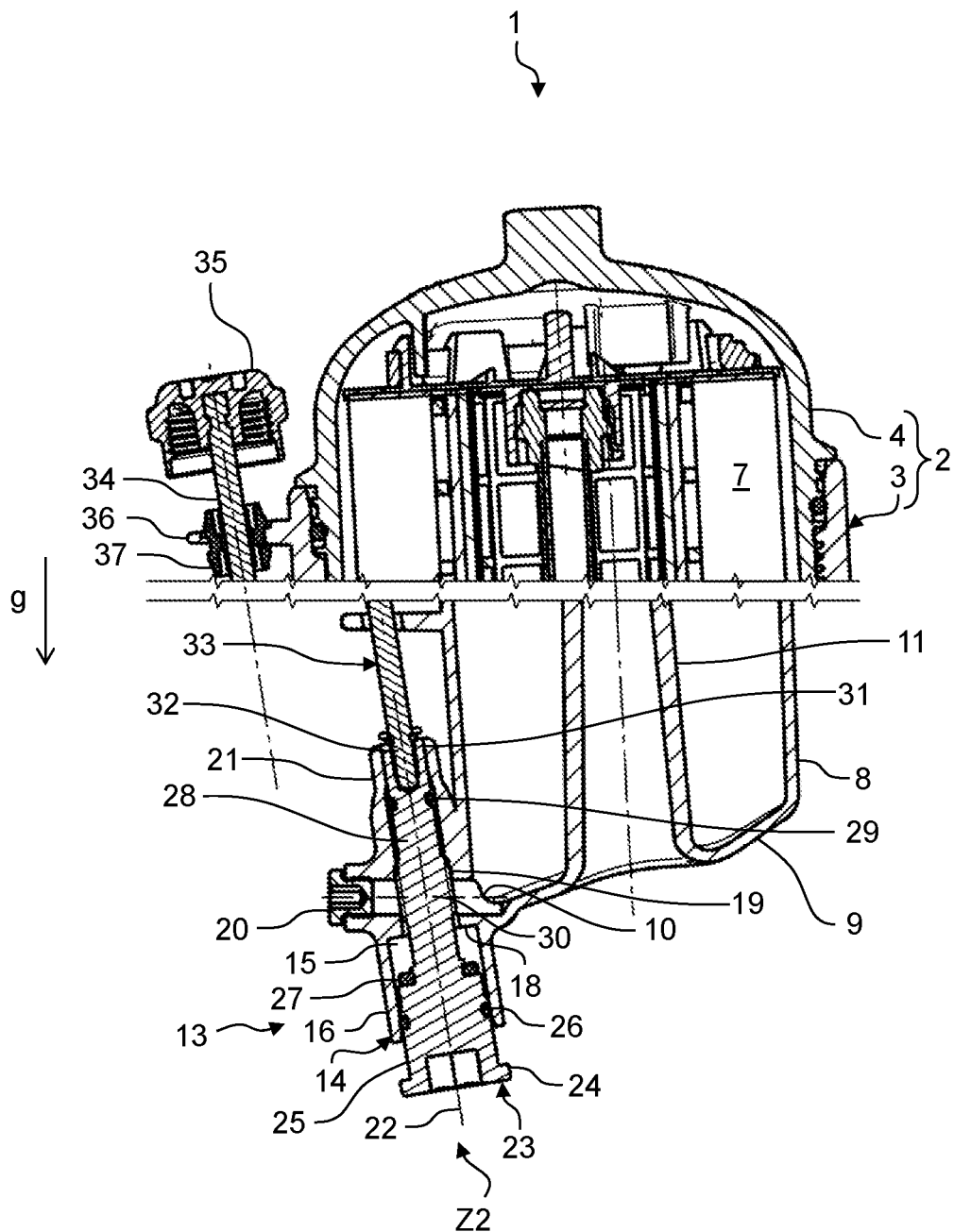
FIG. 5 shows a further schematic partial section view of the filter module according to the section line II-II of FIG. 1.

FIG. 1 shows a schematic partial view of an embodiment of a filter module 1. FIG. 2 shows a schematic section view of the filter module 1 according to the section line II-II of FIG. 1. FIG. 3 shows a further schematic section view of the filter module 1 according to the section line II-II of FIG. 1. FIG. 4 shows a schematic partial section view of the filter module 1 according to the section line II-II of FIG. 1. FIG. 5 shows a further schematic partial section view of the filter module 1 according to the section line II-II of FIG. 1. In the following, reference is being had simultaneously to FIGS. 1 through 5.

The filter module 1 can also be referred to as filter or filter system. Preferably, the filter module 1 is a fuel filter module. The filter module 1 can thus be suitable for filtering fuels such as, for example, diesel, gasoline or kerosene. The filter module 1 can however also be suitable for filtering any other liquid operating substances such as, for example, oil, water, urea solution or the like. The filter module 1 is used preferably in vehicles, in particular in land craft. For example, the filter module 1 can be employed in utility vehicles such as, for example, trucks, construction machines or harvesting machines. In particular, the filter module 1 is suitable for so-called "heavy-duty" applications. The filter module 1 however can also be used in immobile applications, for example, in the building technology.

The filter module 1 comprises a filter housing 2 with a housing bottom part 3 and a housing top part 4 that is removable from the housing bottom part 3. The housing top part 4 can also be referred to as housing cover. The housing bottom part 3 and the housing top part 4 can be connected to each other by means of a screw connection. Between the housing bottom part 3 and the housing top part 4, a seal element, for example, in the form of an O-ring, can be provided. The housing bottom part 3 and the housing top part 4 can be plastic components, in particular injection-molded plastic components. The housing bottom part 3 and the housing top part 4 can also be metal components, in particular diecast aluminum components. The filter module 1 is substantially configured with rotational symmetry to a center or longitudinal axis 5.

The housing bottom part 3 comprises a cup-shaped filter element receiving region 6 which, in the orientation of FIGS. 1 to 5, is closed off in upward direction by the housing top part 4. The filter element receiving region 6 receives a filter element 7. The filter element 7 is exchangeable after removal of the housing top part 4. The filter element 7 is suitable for filtering particles or suspended substances from a fluid to be filtered, for example, fuel. The filter element 7 is a fuel filter element. The filter element 7 is also suitable for separating water W from the fluid to be filtered.

Aside from the filter element receiving region 6, the housing bottom part 3 comprises a water collection chamber 8 which is arranged, viewed along the direction of gravity g, below the filter element receiving region 6 and is configured to receive the water W that has been separated by means of the filter element 7. The water collection chamber 8 comprises a bottom 9 positioned at a slant and is slanted toward a water drainage channel 10. A pin 11 extends away from the bottom 9 in the direction toward the filter element receiving region 6. A fill level sensor 12 is associated with the water collection chamber 8. The fill level sensor 12 is suitable for sending a signal as soon as the fill level of the water W collected in the water collection chamber 8 has reached the fill level sensor 12.

A water drainage device 13 is provided at the water collection chamber 8 which is in fluid communication with the water drainage channel 10 for draining the water W from the water collection chamber 8. The water drainage device 13 can also be referred to as water drainage valve. The water drainage device 13 comprises a valve housing 14 that is configured as one piece, in particular monolithic, with the housing bottom part 3. "One piece" or "one part" means in this context that the valve housing 14 and the housing bottom part 3 are not assembled of different components but form one component. "Monolithic" means in this context that the valve housing 14 and the housing bottom part 3 are manufactured throughout of the same material.

The valve housing 14 is hollow and encloses a stepped valve bore 15 (FIG. 5). The valve bore 15 widens viewed along the direction of gravity g. The valve bore 15 comprises a receiving section 16. The receiving section 16 is in fluid communication with a water drainage socket 17 (FIG. 1) which is formed integrally at the valve housing 14. The receiving section 16 extends all the way to a disk-shaped valve seat 18 (FIG. 5). A thread section 19 adjoins the valve seat 18 and comprises an inner thread in the form of a left-hand thread. The water drainage channel 10 opens into the thread section 19. The water drainage channel 10 is fluid-tightly closed by means of a plug 20. A further receiving section 21 adjoins the thread section 19.

The valve bore 15 is configured with rotational symmetry to a center or longitudinal axis 22. The longitudinal axis 22 is positioned at a slant at a slant angle α in relation to the longitudinal axis 5. The slant angle α is an acute angle. "Acute angle" is to be understood presently as an angle of less than 90°. For example, the slant angle α amounts to 5° to 20°.

The water drainage device 13 comprises a valve body 23 that is received in the valve bore 15. In this context, the valve body 23 is linearly movable within the valve bore 15 along the longitudinal axis 22. The valve body 23 comprises—like the valve bore 15—a stepped geometry. The valve body 23 comprises a plate-shaped end section 24 whose outer diameter is larger than an inner diameter of the receiving section 16. The end section 24 is adjoined by a seal section 25 which is received in the receiving section 16 so as to be movable linearly along the longitudinal axis 22. The seal section 25 is cylindrical.

The seal section 25 comprises a seal element 26, for example, an O-ring, that is received in a corresponding groove of the seal section 25. The seal element 26 is suitable for sealing the seal section 25 radially in relation to the receiving section 16. A seal element 27 is provided at the end face at the seal section 25. The seal element 27 can also be an O-ring. The seal element 27 can however also comprise a rectangular cross section. The seal element 27 is suitable for sealing axially in relation to the valve seat 18. "Axial" means in this context viewed along the longitudinal axis 22.

A rod-shaped actuation section 28 adjoins the seal section 25. A seal element 29 is provided at the actuation section 28. The seal element 29 can be an O-ring which is received in a matching groove of the actuation section 28. The seal element 29 is suitable to seal the valve body 23 radially in relation to the valve bore 15. A counter thread section 30 corresponding to the thread section 19 is provided at the actuation section 28 between the seal element 27 and the seal element 29. The counter thread section 30 is an outer thread. The counter thread section 30 is a left-hand thread.

The actuation section 28 comprises an end face receiving region 31 which is facing away from the seal section 25 and in which a first end section 32 of an actuation rod 33 is received with form fit. A form-fit connection is produced by the mutual engagement or engagement from behind of two connection partners. For example, the first end section 32 and the receiving region 31 each comprise a quadrangular or hexagonal geometry so that by means of the actuation rod 33 a torque can be applied onto the valve body 23. The connection between the end section 32 of the actuation rod 33 and the receiving region 31 of the actuation section 28 of the valve body 23 can be realized alternatively also by other connection means that permit a torque-transmitting connection, e.g., an adhesive connection or a screw connection secured against release.

A handwheel 35 is attached to a second end section 34 of the actuation rod 33 which is facing away from the first end section 32. The actuation rod 33 is passed through an eye 36 which is integrally formed at the housing bottom part 3. In the eye 36, an elastically deformable sleeve 37 is received, in particular a rubber sleeve. The actuation rod 33 is passed through the sleeve 37.

The function of the water drainage device 13 will be explained in the following. In operation of the filter module 1, the filter element 7 separates water W which is collected in the water collection chamber 8. As soon the fill level of the water W in the water collection chamber 8 has reached the fill level sensor 12, the latter issues a corresponding signal. By means of the signal, for example, an acoustic and/or optical signal transmitter can be controlled by means of which a user is advised that a maximum fill level of the water W is reached in the water collection chamber 8.

The user actuates then the water drainage device 13 in order to drain the water W from the water collection chamber 8. For this purpose, the user displaces the valve body 23 in the valve bore 15 along the longitudinal axis 22 in downward direction out of the valve bore 15 so that a fluid connection is produced between the water drainage channel 10 and the receiving section 16. This is realized in that the seal element 27 attached to the valve body 23 is lifted off its valve seat 18 by displacement of the valve body 23 along the longitudinal axis 22. In doing so, the water drainage device 13 is transferred from a closed state Z1, in which the seal element 27 contacts the valve seat 18, into an open state Z2, in which the seal element 27 is lifted off the valve seat 18.

Since the water drainage socket 17 leads out of the receiving section 16, the water W flows through the water drainage channel 10 into the receiving section 16 and from there through the water drainage socket 17 into an environment of the filter module 1. The water W flows from the water drainage channel 10 through a gap extending around the valve body 23 into the receiving section 16. Due to the slanted bottom 9 of the water collection chamber 8, the latter is completely emptied. The seal element 26 seals the valve body 23 radially in relation to the receiving section 16. After emptying the water collection chamber 8, the water drainage device 13 is returned again into the closed state Z1.

Transferring the water drainage device 13 from the closed state Z1 into the open state Z2 and in reverse is realized in that the user rotates the handwheel 35, in particular in counterclockwise direction. Due to the interaction of the thread section 19 of the valve bore 15 with the corresponding counter thread section 30, the valve body 23 is displaced then along the longitudinal axis 22 out of the valve bore 15 and back into it again.

The water drainage device 13 has the advantage that it is easily accessible from above by means of the handwheel 35. The thread of the thread section 19 can be introduced without it being necessary to configure the valve housing 14 as a component that is separate from the housing bottom part 3. For example, the housing bottom part 3 can be clamped on a machine tool and the thread can be cut from above into the thread section 19. In this way, it is also possible to place the valve body 23 as close as possible to the water collection chamber 8.

As best seen in FIGS. 4 and 5, the water drainage device 13 has a valve housing 14 elongated along a longitudinal axis 22 from a first axial end face 31 of the valve housing 14 to an opposite second axial end face 16 of the value housing 14. The valve bore 15 extends axially along the longitudinal axis 22, extends completely through the valve housing 14 from the first axial end face 31 of the valve housing 14 to the opposite second axial end face 16 of the value housing 14. The valve bore 15 opens to an exterior of the value housing 14 at both the first axial end face 31 and at the opposite second axial end face 16 of the valve housing 14. The elongated valve body 23 is received in the valve bore 15 and extends completely through the valve housing 14 in the valve bore 15 and protrudes outwards through the first axial end face 31 of the valve housing 14 and protrudes outwards through the opposite second axial end face 16 of the valve housing 14. The elongated valve body 23 forms an annular step surface where a larger outer diameter portion of the elongated valve body 23 transitions to a smaller diameter counter thread section 30 of the elongated valve body 23. As seen in FIGS. 4 and 5, the larger outer diameter portion of the elongated valve body 23 protrudes axially outwards through the opposite second axial end face 16 of the value housing 14. The second seal element 27 formed as an annular seal ring 27 is arranged on the annular step surface and positioned to axially seal against a disc-shaped valve seat 18 of the valve housing 14.

EMPLOYED REFERENCE CHARACTERS 1 filter module
2 filter housing
3 housing bottom part
4 housing top part
5 longitudinal axis
6 filter element receiving region
7 filter element
8 water collection chamber
9 bottom
10 water drainage channel
11 pin
12 fill level sensor
13 water drainage device
14 valve housing
15 valve bore
16 receiving section
17 water drainage socket
18 valve seat
19 thread section
20 plug
21 receiving section
22 longitudinal axis
23 valve body
24 end section
25 seal section
26 seal element
27 seal element
28 actuation section
29 seal element
30 counter thread section
31 receiving region
32 end section
33 actuation rod
34 end section
35 handwheel
36 eye
37 sleeve
g direction of gravity
W water
Z1 state
Z2 state
α slant angle

What is claimed is:

1. A filter module comprising:
a filter housing including a liquid collection space; and
a water draining device integral with the filter housing arranged externally to the filter housing;
wherein the water draining device comprises:
a valve comprising:
a valve housing;
a valve bore; and
a valve body;
wherein the valve bore is configured to be complementary to the valve body; and
an actuation rod configured to actuate the valve body;
wherein the valve body in a closed state seals with a valve seat of the valve bore and the valve body in an open state is lifted off the valve seat; and
wherein the liquid collection space is in fluid communication outside of the filter housing when the valve body is in an open state.

2. The filter module of claim 1, wherein the filter housing comprises a filter housing top part and a filter housing bottom part.

3. The filter module of claim 2, wherein the housing top part and the housing bottom part are configured to be connected by a screw connection.

4. The filter module of claim 2, wherein the housing top part and the housing bottom part are configured to have a seal element placed between them when connected.

5. The filter module of claim 1, wherein the filter housing and the water draining device are monolithic.

6. The filter module of claim 1, wherein the valve bore extends through the valve housing from a first axial face of the valve housing to a second axial face of the valve housing.

7. The filter module of claim 1, wherein the valve body is configured to engage with a disk-shaped valve seat arranged on the valve bore.

8. The filter module of claim 1, wherein the valve body is configured to move linearly within the valve bore.

9. The filer module of claim 1, wherein the valve body is configured to move between a closed state and an open state by actuation of the actuation rod.

10. The filter module of claim 1, wherein the movement of the valve body to a closed state is in the direction of gravity.

* * * * *